(12) United States Patent
Baumgartner et al.

(10) Patent No.: US 10,647,511 B2
(45) Date of Patent: May 12, 2020

(54) OBJECT TRANSPORTATION APPARATUS

(71) Applicant: Seidenader Maschinenbau GmbH, Markt Schwaben (DE)

(72) Inventors: Hans Baumgartner, Ruhpolding (DE); Zeno Bauer, Isen (DE); Bernhard Huber, Pastetten (DE); Johann Möstl, Parsdorf (DE)

(73) Assignee: Seidenader Maschinenbau GmbH, Markt Schwaben (DE)

( * ) Notice: Subject to any disclaimer, the term of this patent is extended or adjusted under 35 U.S.C. 154(b) by 0 days.

(21) Appl. No.: 15/966,071

(22) Filed: Apr. 30, 2018

(65) Prior Publication Data

US 2018/0319596 A1     Nov. 8, 2018

(30) Foreign Application Priority Data

May 2, 2017   (DE) ........................ 10 2017 004 232

(51) Int. Cl.
    *B65G 15/58*     (2006.01)
    *B65G 47/32*     (2006.01)
    (Continued)

(52) U.S. Cl.
    CPC ............. *B65G 15/58* (2013.01); *B65G 47/32* (2013.01); *B65G 47/681* (2013.01); *B65G 47/69* (2013.01);
    (Continued)

(58) Field of Classification Search
    CPC ...... B65G 47/841; B65G 47/31; B65G 47/52; B65G 47/84; B65G 33/04; B65G 33/30;
    (Continued)

(56) References Cited

U.S. PATENT DOCUMENTS 2,344,975 A * 3/1944 De Back ................. B65B 43/52
                                                           198/459.4
2,571,036 A * 10/1951 Johnson ................. B65G 47/28
                                                            198/459.4

(Continued)

FOREIGN PATENT DOCUMENTS

DE     103 60 082 A1     7/2005
WO    2011/015423 A1     2/2011
WO    2014/096588 A1     6/2014

*Primary Examiner* — James R Bidwell
(74) *Attorney, Agent, or Firm* — Dilworth & Barrese, LLP (57) ABSTRACT

The present invention relates to an object transportation apparatus for transferring articles from a supply device to a take-away device, comprising at least two, preferably three, transportation belts that are arranged above one another in their width directions and that each have a separate drive; a plurality of reception elements of which at least one is arranged at each of the transportation belts and that serve to receive the articles to be transported; and a screw element that is configured to cooperate with the plurality of reception elements to transfer an article to be transported to one of the plurality of reception elements in a transfer zone or to take it over from one of the plurality of reception elements, wherein the screw element has a first section having an unchanging diameter and a second section having a diameter larger in comparison at which the screw element cooperates with the plurality of reception elements.

13 Claims, 6 Drawing Sheets

(51) Int. Cl.
*B65G 47/68* (2006.01)
*B65G 47/84* (2006.01)
*B65G 33/04* (2006.01)
*B65G 47/08* (2006.01)
*B65G 47/69* (2006.01)

(52) U.S. Cl.
CPC ............ *B65G 33/04* (2013.01); *B65G 47/082* (2013.01); *B65G 47/841* (2013.01); *B65G 2201/0244* (2013.01)

(58) Field of Classification Search
CPC ...... B65G 15/58; B65G 47/681; B65G 47/69; B65G 47/082; B65G 47/32
USPC ..... 198/459.3, 459.4, 419.2, 867.11, 867.14, 198/817
See application file for complete search history.

(56) References Cited

U.S. PATENT DOCUMENTS

| | | | | |
|---|---|---|---|---|
| 2,890,787 | A * | 6/1959 | Carter | B65C 9/06 198/411 |
| 3,833,110 | A * | 9/1974 | Riggs | B65G 21/2072 198/459.4 |
| 8,851,881 | B2 * | 10/2014 | Zacche | B29C 49/4205 198/459.1 |
| 2010/0258404 | A1 * | 10/2010 | Warecki | B65B 5/103 198/339.1 |
| 2013/0330437 | A1 * | 12/2013 | Zacche | B29C 49/4205 198/459.4 |
| 2015/0321857 | A1 * | 11/2015 | Sacchetti | B65B 35/405 198/419.2 |

* cited by examiner

OBJECT TRANSPORTATION APPARATUS

BACKGROUND OF THE INVENTION

The present invention relates to an object transportation apparatus for transferring articles from a supply device to a take-away device.

In particular on the processing of pharmaceutical containers such as syringes, ampoules, syringe cartridges, flasks, or vials, it is frequently necessary to move from a linear, continuous object transportation into a clocked transportation, or vice versa. Pharmaceutical containers to be inspected are thus removed from a container nest in a clocked manner and are transported into a continuous conveying path. Object transportation apparatus exist for this purpose that are intended to carry out such a transition from a clocked transportation to a linear transportation as quickly and as efficiently as possible.

It is problematic in this connection that a contacting of the pharmaceutical containers or of the articles to be transported between one another is not desired due to increased demands on manufacturing reliability. Transportation without glass contact is spoken of here since the pharmaceutical containers typically consist of plastic and do not mutually contact one another. If the linearly conveyed articles jolt against one another, cracks or other damage can form in the outer skin of the mutually abutting articles under certain circumstances. It is therefore desirable to avoid any physical contact of the articles to be conveyed to prevent damage on the transportation of these articles.

If deficient articles are rejected, the gap that thereby arises should be closed by pushing up the following articles. The maintenance of the gap in the conveying path, however, reduces the total conveying capacity and is an obstacle for renesting, that is the insertion of the articles to be transported into a storage container (the so-called nest) provided for this purpose. Robot arms are namely frequently used here that are configured to raise a plurality of articles following one another in a row out of the conveying path with one movement and to transport them into a region of the nest provided for this purpose. If there is now an empty position in the linear conveying path, it will also be present in the nest if no corresponding counter-measures are taken and it will have to be filled manually under certain circumstances.

Conversely, it can also be desirable to produce empty positions in a denester. An article, for example a container, that is to be inspected again can hereby be inserted in an empty position previously deliberately produced in a downstream inspection machine.

SUMMARY OF THE INVENTION

It is the objective of the present invention to overcome the above-named disadvantages and to provide a particularly efficient object transportation apparatus. This is done using the object transportation apparatus that has all the features herein.

The object transportation apparatus for transferring articles from a supply device to a take-away device accordingly comprises at least two, preferably three, transportation belts that are arranged above one another in their width directions and that each have a separate drive; a plurality of reception elements of which at least one is arranged at each of the transport belts and that serve to receive the articles to be transported; and a screw element that is configured to cooperate with the plurality of reception elements to transfer an article to be transported to one of the plurality of reception elements in a transfer zone or to take it over from one of the plurality of reception elements, wherein the screw element has a first section having an unchanging diameter and a second section having a diameter larger in comparison at which the screw element cooperates with the plurality of reception elements.

It is possible by the provision of the separate drives for the plurality of transportation belts which are offset in their width directions and which can extend in parallel that each of the transportation belts can be moved independently of the other transportation belts. Provision can accordingly be made that each of the transportation belts has its own movement profile that runs with a corresponding phase offset with respect to the other movement profiles of the further transport belts.

Independent movement profiles can be implemented at two different transfer points using such an object transportation apparatus. It is thus possible to transition from a slowed-down or clocked conveying stream to an accelerated or continuous conveying stream at one transfer position and to transition from continuous to clocked at another transfer position. Articles can accordingly, for example, be removed at one of the transport positions in the slowed-down state or while stationary and can be transferred in linear fashion to the reception elements of the transportation belts at the other transfer position. It would additionally be conceivable that a transition can be made from a discontinuous product division (for example in or out of a nest) to a continuous movement having a fixed product interval corresponding to the division of the object transportation apparatus.

The movement routines at the transfer positions are independent of one another so that on a brief stop at the one transfer, the other movement at the other transfer does not necessarily also have to become stationary immediately and stop simultaneously. The one movement cycle that is generated by the displacement of the one transport belt can thus still be ended and does not have to be aborted simultaneously with the stopping at another transfer position.

In accordance with a further optional further development of the invention, the second section of the screw element cooperating with the plurality of reception elements has a diameter that increases continuously starting from the diameter of the first section toward the transfer zone and is preferably configured in the region of its maximum diameter to cooperate with the plurality of reception elements.

The screw element therefore substantially has a region of a constant diameter that then merges into a second region that has a larger, flared screw diameter. The screw element accordingly has a trumpet shape since the screw element increases continuously in diameter toward its flared end.

The advantage resulting from this is produced in that even faster movement profiles are possible using the plurality of transportation belts. The screw diameter that is larger and flared in the transfer zone tapers toward a smaller screw diameter, whereby an article transferred from the belt to the screw element is led on a very short path away from the transport belt. This has the advantage that the transport belts or the reception elements connected to the transportation belts can again be freely moved on after a brief time due to the fast leading away of the articles since the products are no longer in engagement and thus no longer mesh. The synchronously running zone at which the articles are connected to the reception elements of the object transportation device and to the screw elements is considerably shortened due to the trumpet shape of the screw element on the transition.

This provides a greater freedom of design for the different movement profiles or travel profiles in the object transportation itself. It is possible with such a modified apparatus to achieve higher production speeds and a higher number of cycles, i.e. a higher throughput and a better machine performance. The machine furthermore has a substantially smaller size so that less space is required for its installation.

In accordance with a further development of the invention, provision can be made that the first section and the second section of the screw element are separate from one another and have a respective separate drive. It is now possible with the aid of the separate drive to allow the first section and the second section of the screw element to rotate independently of one another.

The advantage can thus now be achieved, for example, that in an object transportation apparatus whose articles are conveyed contactlessly among one another, empty positions between the articles to be conveyed can be closed or deliberately produced. It is advantageous for a number of applications if the articles to be transported do not mutually contact one another (so-called "no glass to glass contact"). If now, for example, the screw element is used to transfer an article to be transported to a reception element and if there is an empty position in the supply of the screw element that has been produced, for example, by rejecting the corresponding article in an inspection apparatus, this empty position can be closed in that a screw element is stopped. It is accordingly possible using the present apparatus to carry out a contactless, product-saving object transportation with empty position compensation.

In accordance with a further optional further development of the invention, the screw element rotates about an axis that is perpendicular to the width direction of the at least two transportation belts. Provision can additionally be made that the axis of rotation is in parallel with a longitudinal movement covered by the transportation belt. The screw element preferably rotates about an axis that is in parallel with the longitudinal direction of the transport belt at the transfer position formed by the screw element.

Provision is preferably made that the plurality of reception elements are each arranged at the transportation belts such that they convey the articles to be transported in a common plane. The reception elements accordingly differ depending on which of the transport belts arranged above one another they are fastened to.

In accordance with a further optional further development of the invention, a plurality of reception elements are arranged in a group at each of the transport belts, preferably such that the plurality of reception elements of a group are adjacent to one another or adjoin one another in a longitudinal direction of the transportation belt to form a shuttle for a plurality of articles to be transported. This grouping of reception elements, that is the shuttle, allows a clocked removal or reception of articles to be transported. If, for example, a shuttle provided with articles is stopped, an automatic gripper can take up the articles without problem and supply them to a nest. It is likewise possible in the reverse direction, that is the supply of the articles into the receivers.

Provision can be made here that each of the transportation belts is connected to the at least one reception element via a releasable connection, with the transportation belt preferably having a fastening element for this purpose that projects out of its belt surface and that can be brought into connection with a reception element by a dovetail connection or by another connection by plugging on or snapping on. A T-clip can be used here, for example, that projects perpendicular from the areal side of a transportation belt.

It is ensured by the attachment of the reception elements to the fastening elements of the transportation belt that articles differing in their formats can also be transported by the object apparatus. It is then only necessary for this purpose to connect the reception elements coordinated with the object to the fastening element of the associated transportation belt or of the associated transportation belts or to change them in dependence on the format of the articles to be transported.

Provision can furthermore be made in this respect that fastening elements projecting from the belt surface are present for entering into the releasable connection and are arranged with a specific, fixed division with respect to one another at a corresponding transportation belt and the reception elements that can be brought into connection with the fastening elements for forming a shuttle for a plurality of articles to be transported are divided in accordance with the specific, fixed division of the arrangement of the fastening elements.

In other words, the grouping of the plurality of reception elements that forms a shuttle for the articles to be transported is divided with the same division as the fastening elements at the belt surface. The separation of the shuttle takes place here without considering the division of the articles to be transported.

Provision can furthermore be made here that the shuttle formed from a plurality of reception elements is separated without considering the actual division of the articles to be conveyed so that the center of the shuttle is preferably hereby always exactly at the same position of the transportation belt independently of the size and of the format of the articles to be transported. This also applies when differently dimensioned shuttles are arranged at the transportation belt. The separation into a plurality of part pieces of the shuttle is also necessary to minimize the forces acting on the shuttle on a deflection of the belt. The radius of the transportation band pulleys can furthermore be reduced so that the transportation band requires less space.

In accordance with a further optional further development of the invention, the plurality of transportation belts are guided substantially the same expect for their arrangement offset in the width direction of the transportation belts and cover the same path.

Provision can preferably be made that the apparatus furthermore comprises a belt drive control unit that is configured to control each of the plurality of separate drives of the transportation belts independently of one another so that the transportation belts can be driven at different speeds and not at a constant speed. Each of the plurality of transportation belts can accordingly be moved independently of another transportation belt with the aid of the belt drive control unit.

In accordance with a further optional modification of the invention, the apparatus further comprises a screw element drive control unit that is configured to control each of the separate drives of the plurality of sections of the screw element independently of one another to close and to produce free empty positions in a product flow of articles to be transported.

In accordance with a further modification of the invention, a plurality of transition zones are present for supplying or taking away the articles to be transported of which a plurality of articles can be supplied or led off in a slowed down or clocked manner at one transition zone and can be supplied or taken away in an individually linearly accelerated or continuous manner at another transition zone.

In accordance with a further development of the invention, the articles to be transported are pharmaceutical containers, for example, syringes, ampoules, syringe cartridges, flasks, and/or vials.

BRIEF DESCRIPTION OF THE DRAWINGS

Further features, details and advantages of the invention will be explained with reference to the following description of the Figures. There are shown.

DESCRIPTION OF THE PREFERRED EMBODIMENTS

Figure 1:
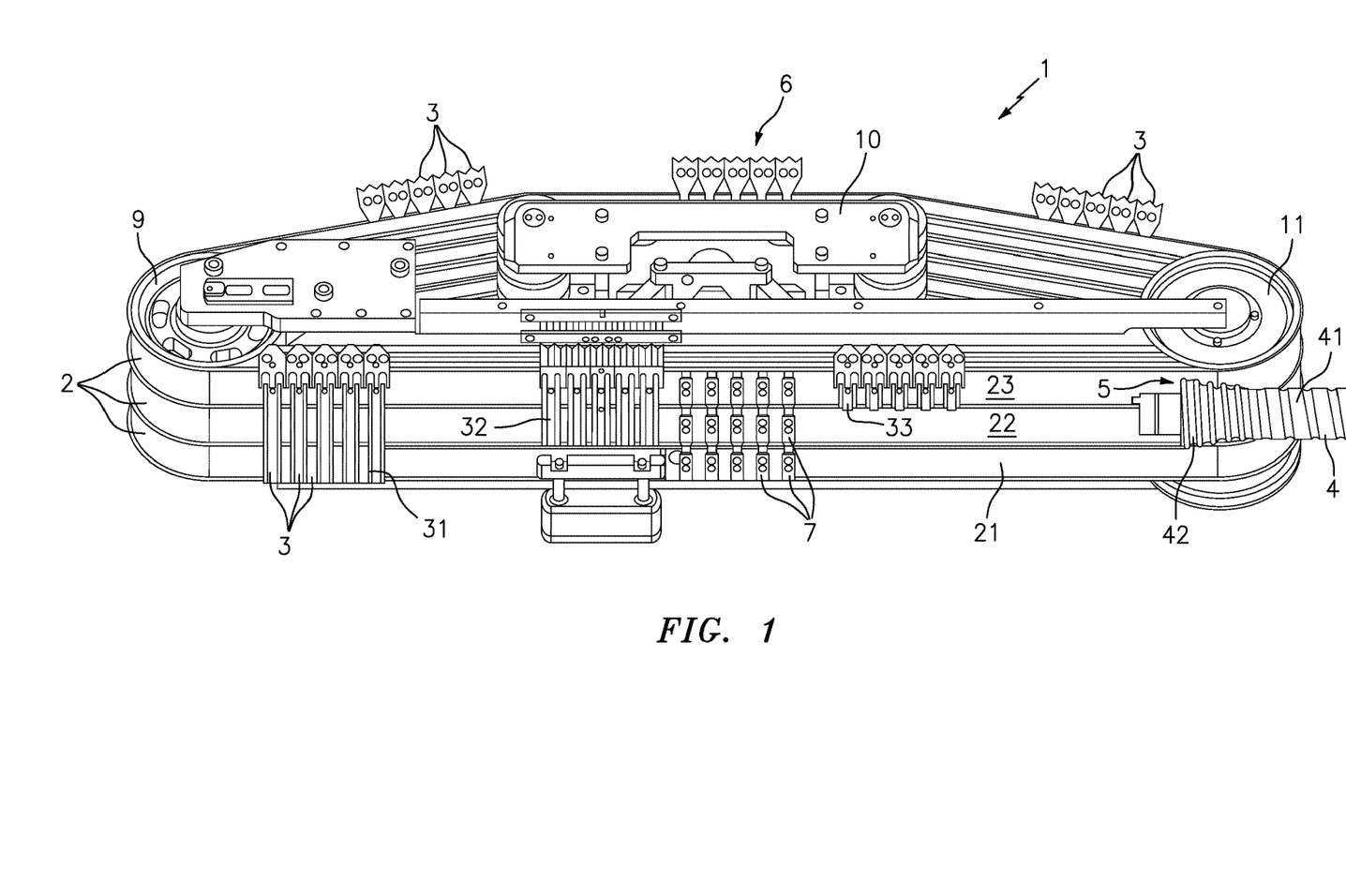
FIG. 1: a perspective view of an object transportation apparatus in accordance with the invention.

FIG. 1 shows a perspective representation of the object transportation apparatus 1 in accordance with the invention. The three transportation belts 2 that are arranged above one another in their width directions can be recognized that consist of a lower transportation belt 21, a center transportation belt 22, and an upper transportation belt 23 in the Figure. Each of the transportation belts 2 here extends about a belt pulley 11 and a belt deflection 9, with each of the transportation belts 2 here cooperating with their own belt pulley 11 or belt deflection 9. The belt pulley 11 of each transportation belt 2 is here provided with its own drive so that the plurality of transportation belts 2 can be moved independently of one another. The transportation belts 2 are here led substantially in parallel with one another so that they extend identically except of their offset in their width directions. The case is, however, likewise covered by the invention that one or more of the transportation belts 2 have a different extent than other transportation belts 2.

A movable belt tensioner 10 is provided for tensioning the transportation belts 2 that are led around the belt pulley 11 and the belt deflection 9, said movable belt tensioner pressing the inner sides of the transportation belts 2 outwardly away and fastening a belt 2 with sufficient pressure to the belt pulley 11 and the belt deflection 9. It is thereby possible to tension the transportation belts 2 in a simple manner by movement of the belt tensioner 10 and, on a possibly required replacement of the belts 2, to move them simply into a non-tensioned state.

Each of the transportation belts 2 is provided with fastening elements 7 that are shown above one another at each of the transportation belts 2 for illustration purposes on the side of the transportation belts 2 facing the observer of FIG. 1. These fastening elements 7, that can be designed as T clips, for example, serve for fastening reception elements 3 to a corresponding transportation belt 21, 22, 23. The reception elements 3 cooperating with the fastening elements 7 differ in dependence on the transportation belt 21, 22, 23 to which they are attached so that overall there are separately designed reception elements 31, 32, 33 (see FIG. 4) for each transportation belt. It is possible due to the different embodiments of the reception elements 3 adapted to the position of the transportation belts to convey the articles to be transported in a common plane independently of the transportation belt 21, 22, 23 conveying them. The reception elements 3 or the articles to be transported by the reception elements 3 are thus always led through the same zone in at least a transition zone 5. The screw element can therefore cooperate with each of the different embodiments 31, 32, 33 of the reception elements without having to carry out a change in position.

The reception elements 3 are here arranged grouped at an associated transport belt 2 so that a plurality of reception elements 3 form a shuttle 6 for transporting a plurality of articles. A shuttle 6 here consists of a plurality of reception elements 3 that are strung together and that are preferably each adjacent to one another.

A transition zone 5 can furthermore be recognized to which the articles to be transported (now shown) can be moved into the reception elements 3 or can be led out of the reception elements 3. For this purpose a screw element 4 is provided in the transition zone 5 that has a second section 42 at its end facing the transition zone 5, said second section having a constantly increasing diameter section in comparison with the first section 41 remote from the transition zone 5. The first section that adjoins the second section is constant in its diameter, in contrast. It is thereby possible to lead the articles to be transported particularly fast and effectively from a transition zone 5 meshing with the respective reception elements 3 so that the transportation belts 2 can again adopt an increased movement speed without a long delay due to the synchronous running with the screw element 4. For reasons of simplicity, each of the transportation belts 2 can be formed as a toothed belt.

Figure 2:
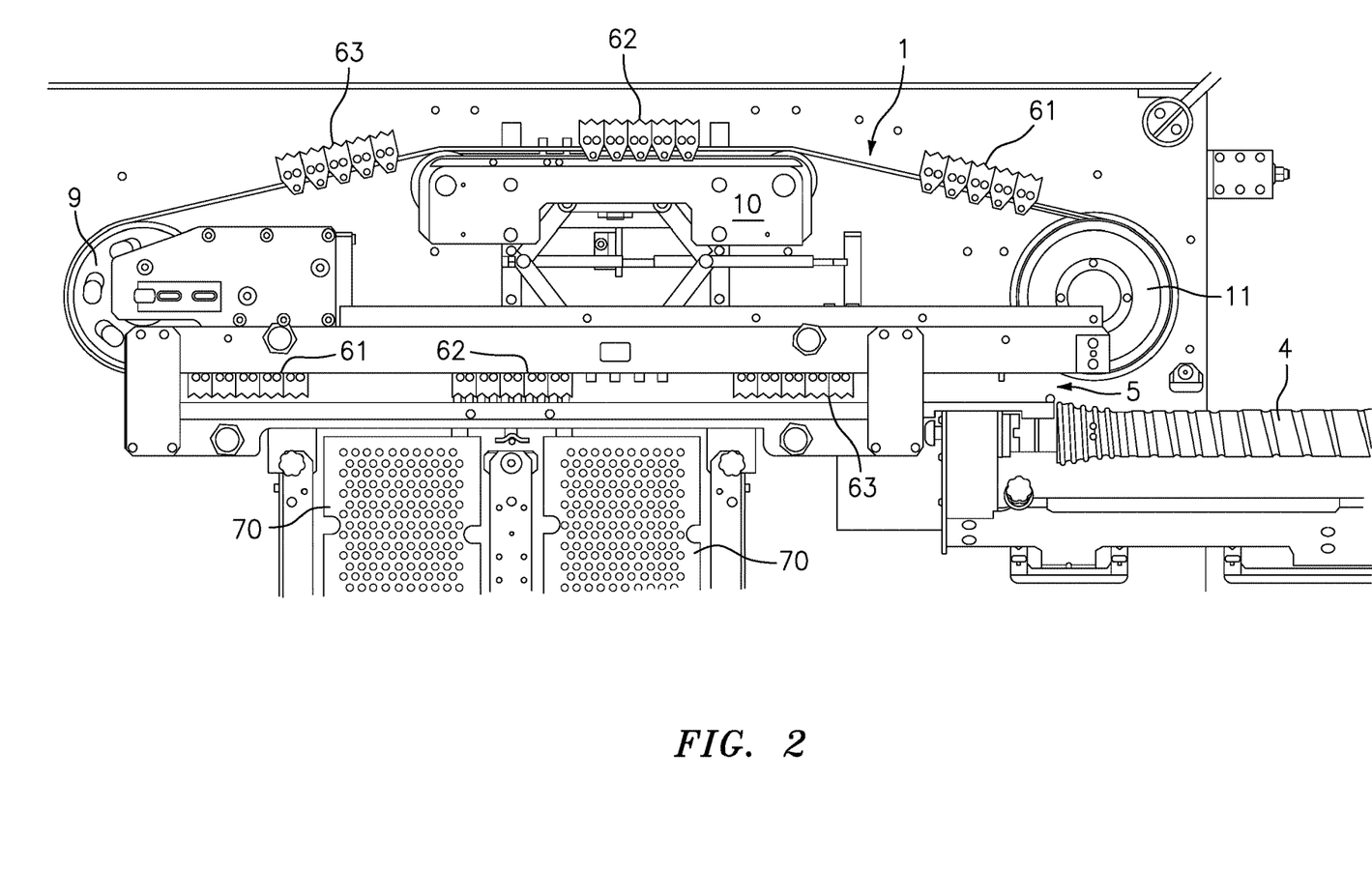
FIG. 2: a plan view of the object transportation apparatus in accordance with the invention.

FIG. 2 shows the object transportation apparatus 1 in accordance with the invention in a view from above. Two nests 70 are arranged in front of the apparatus 1 and the objects to be transported can be inserted into them during a renesting process. It is alternatively also conceivable that the objects are removed from the two nests 70 and are supplied to the apparatus 1 during a denesting process.

The supply or the taking away of the objects from the apparatus takes place in a clocked workstep, typically with the aid of an automated gripping apparatus.

Figure 3:
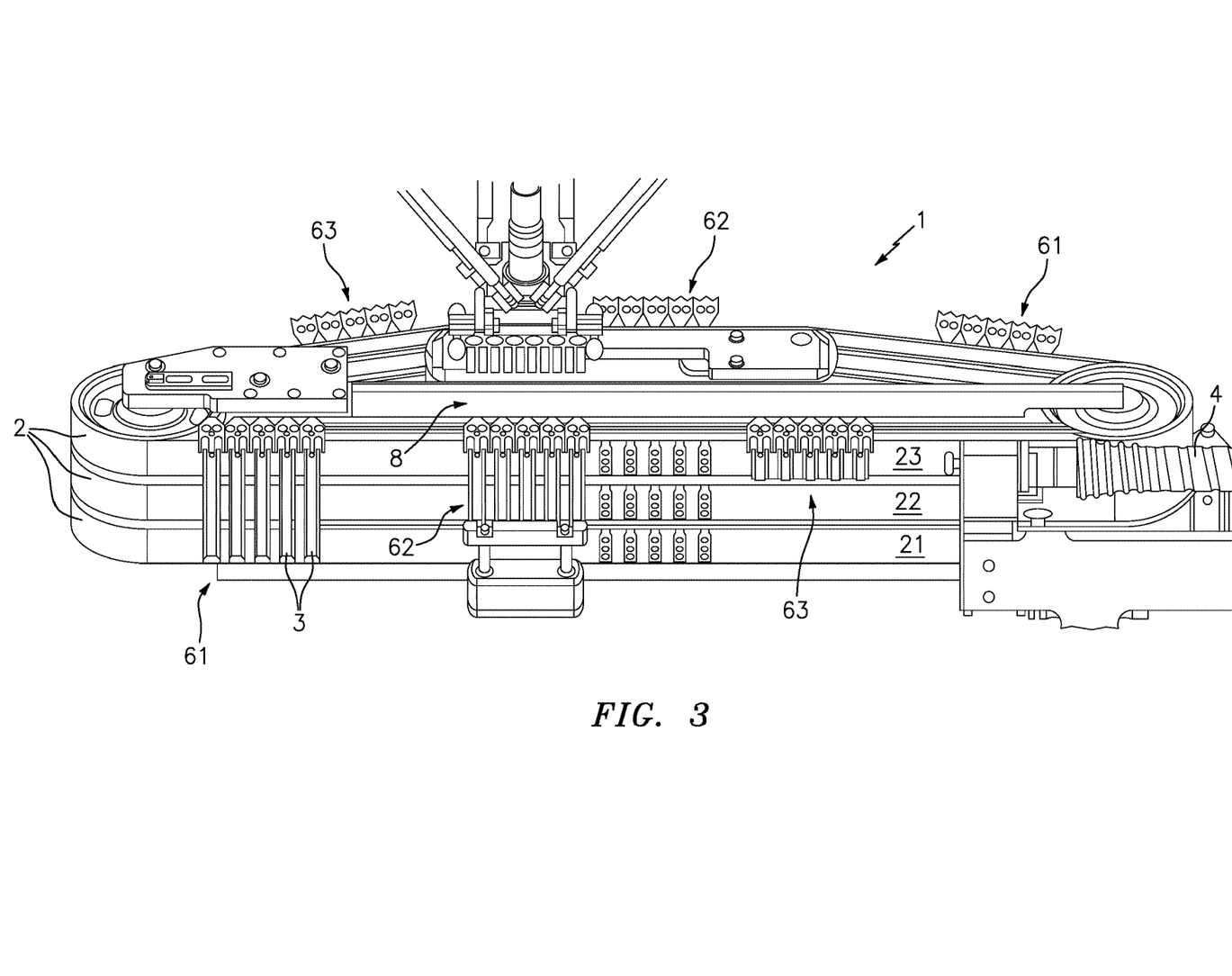
FIG. 3: a further perspective view of the object transportation apparatus in accordance with the invention.

FIG. 3 shows a further perspective representation of the object transportation apparatus 1 in accordance with the invention in which, in addition to the components of FIG. 1 and FIG. 2. a gripping arm 12 is shown that can take out or insert articles conveyed in a reception element 3.

A plurality of syringes arranged in a nest 70 can thus, for example, be picked up by the gripping element 12 and can be moved into the object transportation apparatus 1. For this purpose, the corresponding shuttle 61, 62, 63 only has to stop or slow its movement for a brief moment so that the gripping arm 12 equipped with syringes can transfer them to a corresponding shuttle (shuttle 62 in FIG. 3, for example) during the stop or the slowing down. The other shuttles 61, 63 of the other transportation belts 21, 23 do not have to stop synchronously with the middle transportation belt 22, but can rather be traveled independently in their movement and can, for example, carry out a continuous disposal of articles to be transported via the screw element 4. A second transition zone 8 is accordingly present at which articles to be transported are transferred to the object transportation apparatus 1.

The skilled person naturally understands that the transition zones 5, 8 are configured both to add and to take away articles to be transported and are only set to one of the two options in dependence on a desired application. Provision can be made here that each of the transportation belts 2 comprises a plurality of shuttles 6. They are preferably arranged equidistant from one another along the transportation belt length. It is furthermore of advantage if all the shuttles 6 of the plurality of transportation belts 2 are likewise arranged equidistant from one another along the coinciding transportation belt guide.

Figure 4:
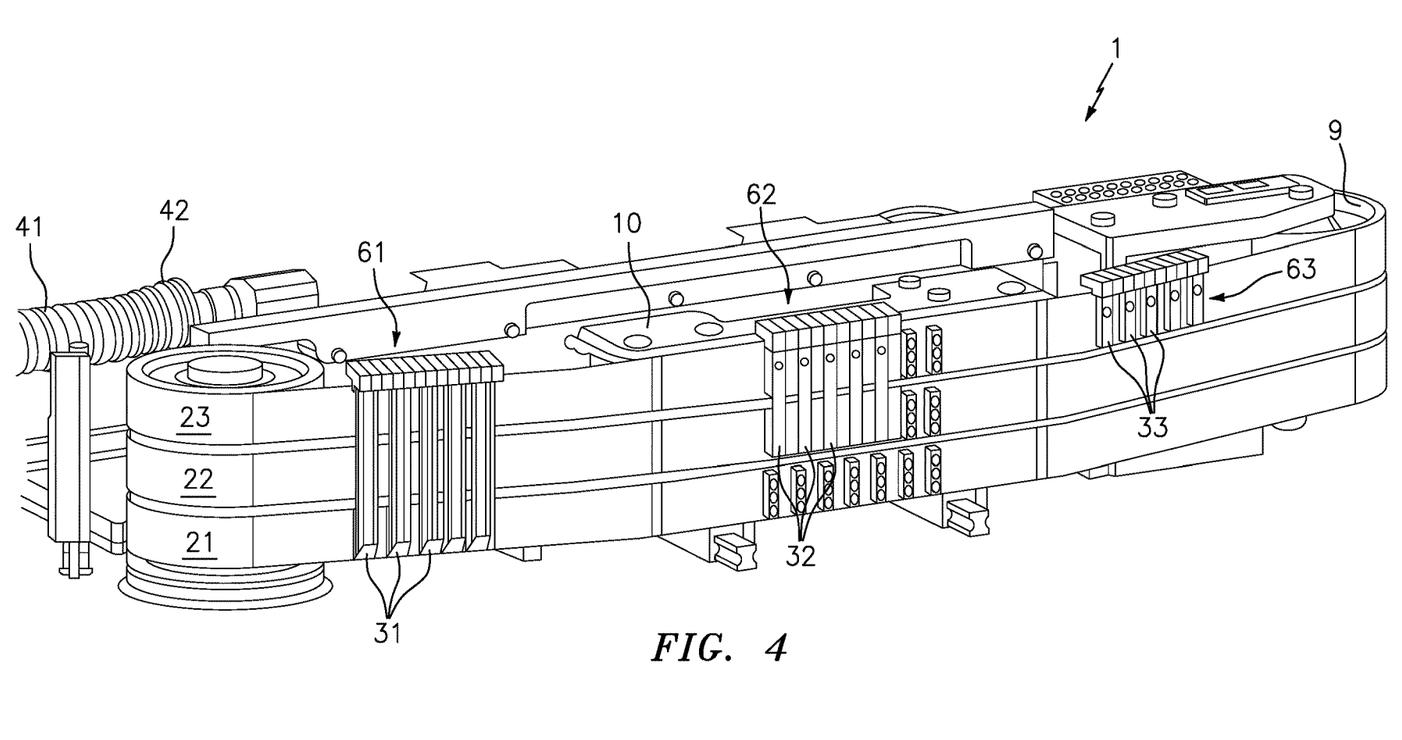
FIG. 4: a rear view of the object transportation apparatus in accordance with the invention.

FIG. 4 shows a rear view of the object transportation apparatus 1 in accordance with the invention. The reception elements 3 that are collected in the shuttle 61, 62, 63 and that differ in dependence on the transport belt 2 with which they cooperate can also be recognized here. The reception elements 31 that cooperate with the lower transportation belt 21 are thus somewhat longer than the reception elements 32 that cooperate with the middle transportation belt 22. They are in turn likewise somewhat longer than the reception elements 33 that cooperate with the upper transportation belt 23. It is thus ensured that the articles to be transported are located in the same plane independently of the reception elements 31, 32, 33 with which they are transported.

Figure 5:
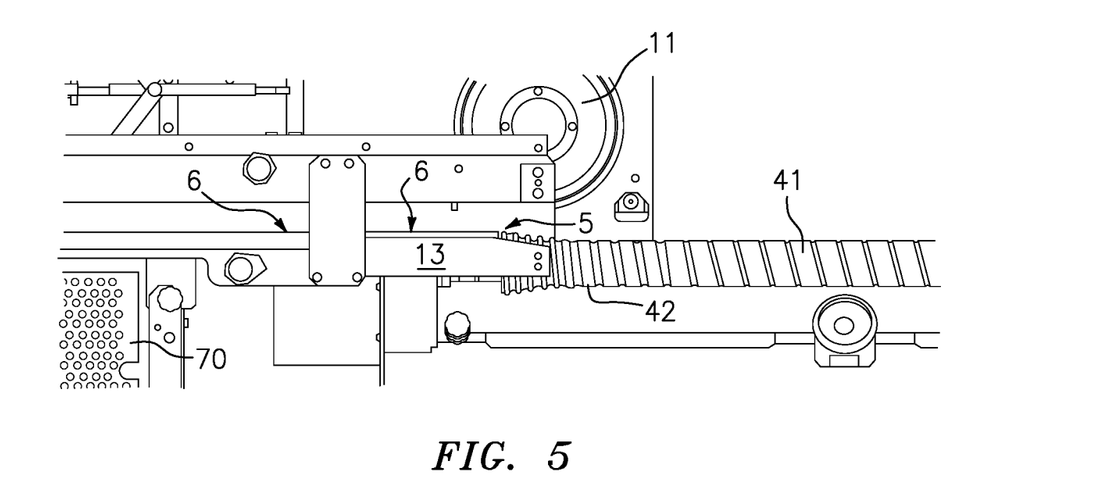
FIG. 5: a plan view in a transfer zone of the object transportation apparatus with a screw element.

FIG. 5 shows a plan view of a transition zone 8 for lifting the articles to be transported in or up. The belt pulley 11 and reception elements 3 that are guided at a transportation belt and that form shuttle 6 can be recognized. A part of the trumpet-like screw element 4 projects in the transition zone 5. The section 42 of the screw element 4 whose diameter constantly increases can transfer an article to be transported to a reception element 3 or can pick the article up from the reception element 3. A guide rail 13 serves, in interplay with the reception elements, for a controlled movement of the objects. The guide rail 13 extends in a region in parallel with the transportation belts 2 and then transitions in the transition zone to follow the contour of the screw element 4. A smooth transition between the reception elements 3 and the screw element 4 is thus possible.

Since the two sections 41, 42 of the screw element 4 can be provided with separate drives, it is additionally possible to close or produce gaps in the supply/removal of the articles to be transported in that one of the two sections 41, 42 of the screw is stopped so that the gaps are closed or are produced as required.

Figure 6:
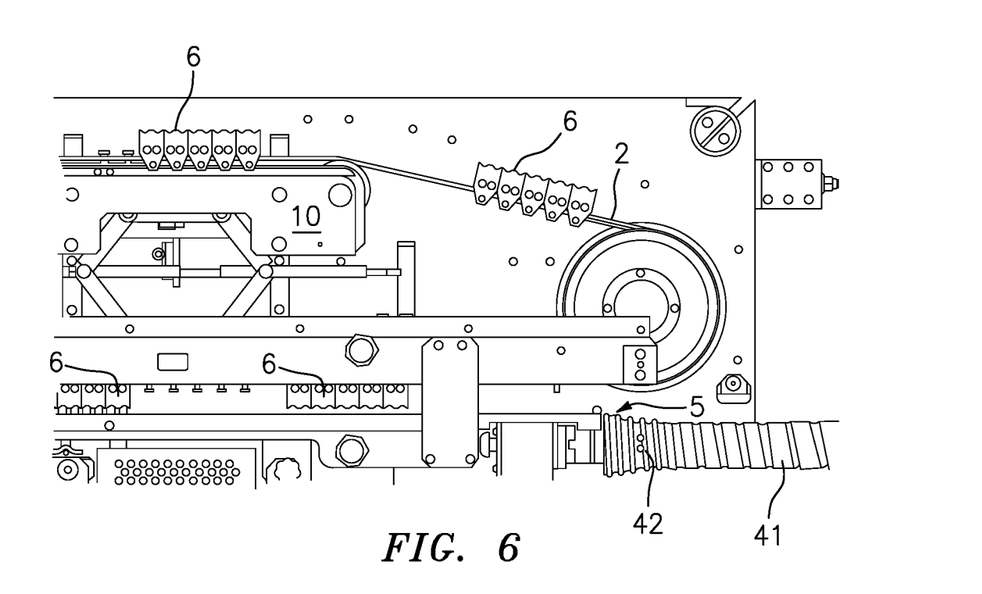
FIG. 6: a plan view in a transfer zone of the object transportation apparatus without guide rails shown.

FIG. 6 is a further representation of the transition zone 5 from above in which the guide rail 13 is not shown.

Figure 7:
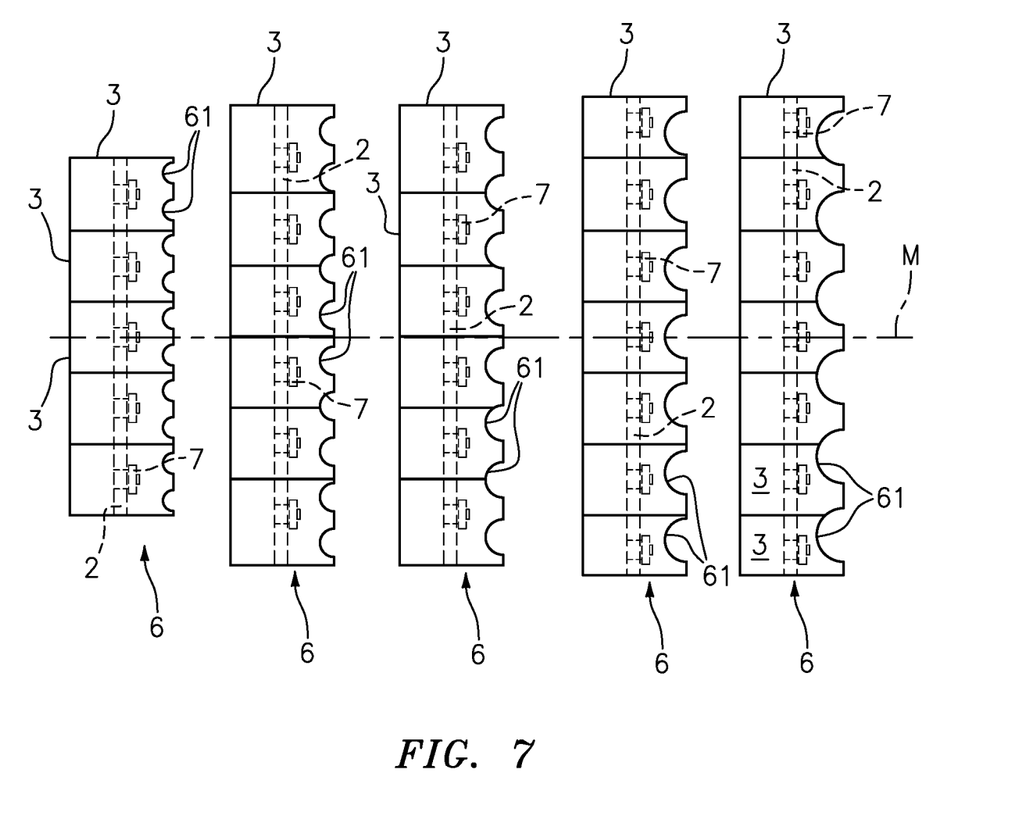
FIG. 7: a representation of a plurality of shuttles for different formats of reception elements and the separation of the shuttle.

FIG. 7 shows a plurality of shuttles 6 that are composed of a plurality of reception elements 3.

A transportation belt 2 and the fastening element 7 projecting therefrom for attaching a reception element 3 can be recognized in a chain-dotted representation. As has already been explained above, a shuttle 6 is produced from the stringing together of a plurality of reception elements 3 that are adjacent to one another or adjoin one another. An object can be conveyed along a predefined path with the aid of the indentations 61 remote from the transport belt in interplay with the guide rail 13 (see FIG. 5). It is now the main feature of the present invention to arrange the indentations 61 of the reception elements in a division that only takes account of the format of the objects to be transported and is not oriented on the interval or on the division of the fastening elements 7 arranged at the transportation belt. The shuttle 6 in contrast comprises a plurality of reception elements that have the same division as the fastening elements.

In other words, the shuttle 6 is here divided in accordance with the division of fastening elements 7 attached to a transportation belt, and indeed independently of which format or size of an article to be transported is to be transported with the shuttle 6. The shuttle divided into a plurality of part pieces accordingly has the same division as the arrangement of the plurality of fastening elements 7 at an associated transportation belt 2. It can be recognized that the division of the shuttle 6 is carried out without consideration of the actual product division, that is of the intervals of the article to be transported in the shuttle 6 that can be recognized with reference to the indentations 61.

It is thereby possible always to position the center of the shuttle 6 at the same position, which permits a simpler operation in the use of different formats of objects to be transported.

The invention claimed is:

1. An object transportation apparatus (1) for transferring articles from a supply device to a take-away device, comprising:
   at least two transportation belts (2) arranged above one another in their width directions and each having a separate drive;
   a plurality of reception elements (3) of which at least one is arranged at each of the transportation belts (2) and which serve to pick up the articles to be transported; and
   a screw element (4) configured to cooperate with the plurality of reception elements (3) to transfer an article to be transported to one of the plurality of reception elements (3) in a transition zone (5) or take them over from one of the plurality of reception elements (3), wherein
   the screw element (4) has a first section (41) having an unchanging diameter and a second section (42) having a diameter larger where the screw element (4) cooperates with the plurality of reception elements (3); and
   the second section (42) of the screw element (4) cooperating with the plurality of reception elements (3), has a continuously increasing diameter starting from the diameter of the first section (41) toward the transition zone (5) and is configured in the region of its maximum diameter to cooperate with one of the plurality of reception elements (3).

2. An apparatus (1) in accordance with claim 1, wherein a plurality of transition zones (5, 8) are present for supplying or removing the articles to be transported of which a plurality of articles can be supplied to or led away at a transition zone (8) in a clocked manner and individually supplied or led away in a linear continuous manner at another transition zone (8).

3. An apparatus (1) in accordance with claim 1, wherein the articles to be transported are pharmaceutical containers such as syringes, ampoules, syringe cartridges, flasks, and/or vials.

4. An apparatus (1) in accordance with claim 1, wherein the screw element (4) rotates about an axis that is perpendicular to the width direction of the at least two transportation belts (2).

5. An apparatus (1) in accordance with claim 1, wherein the plurality of reception elements (3) are each arranged at the transportation belts (2) such that they convey the articles to be transported in a common plane.

6. An apparatus (1) in accordance with claim 1, wherein a plurality of reception elements (3) are arranged in a group (6) at each of the transportation belts (2), such that the plurality of reception elements (3) of a group are adjacent to one another or adjoin one another in a longitudinal direction of the transportation belt (2) to form a shuttle (6) for a plurality of articles to be transported.

7. An apparatus (1) in accordance with claim 1, wherein the plurality of transportation belts (2) are substantially guided the same with the exception of their arrangement offset in the width direction of the transport belts (2) and cover the same path.

8. An apparatus (1) in accordance with claim 1, further comprising a belt drive control unit that is configured to control each of the plurality of separate drives of the transportation belts (2) independently of one another so that the transportation belts (2) are drivable at different speeds and not at a constant speed.

9. An object transportation apparatus (1) for transferring articles from a supply device to a take-away device, comprising:
 at least two transportation belts(2) that are arranged above one another in their width directions and that each have a separate drive;
 a plurality of reception elements (3) of which at least one is arranged at each of the transportation belts (2) and which serve to pick up the articles to be transported; and
 a screw element (4) configured to cooperate with the plurality of reception elements (3), to transfer an article to be transported to one of the plurality of reception elements (3) in a transition zone (5) or take them over from one of the plurality of reception elements (3), wherein
 the screw element (4) has a first section (41) having an unchanging diameter and a second section (42) having a diameter larger where the screw element (4) cooperates with the plurality of reception elements (3); and
 the first section (41) and the second section (42) of the screw element (4) are separate from one another and have a respective separate drive.

10. An apparatus (1) in accordance with claim 9, further comprising a screw element drive control unit that is configured to control each of the plurality of separate drives of the plurality of sections (41, 42) of the screw element (4) independently of one another to close and produce free empty positions in a product flow of articles to be transported.

11. An object transportation apparatus (1) for transferring articles from a supply device to a take-away device, comprising:
 at least two transportation belts (2) that are arranged above one another in their width directions and that each have a separate drive;
 a plurality of reception elements (3) of which at least one is arranged at each of the transportation belts (2) and which serve to pick up the articles to be transported; and
 a screw element (4) configured to cooperate with the plurality of reception elements (3) to transfer an article to be transported to one of the plurality of reception elements (3) in a transition zone (5) or take them over from one of the plurality of reception elements (3), wherein
 the screw element (4) has a first section (41) having an unchanging diameter and a second section (42) having a diameter larger where the screw element (4) cooperates with the plurality of reception elements (3); and
 each of the transportation belts (2) is connected to at least one reception element (3) via a releasable connection, with the transportation belt (2) having a fastening element (7) that projects out of its belt surface and can be brought into connection with a reception element (3) by a dovetail connection by plugging or snapping on.

12. An object transportation apparatus (1) for transferring articles from a supply device to a take-away device, comprising:
 at least two transportation belts (2)that are arranged above one another in their width directions and that each have a separate drive;
 a plurality of reception elements (3) of which at least one is arranged at each of the transportation belts (2) and which serve to pick up the articles to be transported; and
 a screw element (4) configured to cooperate with the plurality of reception elements (3) to transfer an article to be transported to one of the plurality of reception elements (3) in a transition zone (5) or take them over from one of the plurality of reception elements (3), wherein
 the screw element (4) has a first section (41) having an unchanging diameter and a second section (42) having a diameter larger where the screw element (4) cooperates with the plurality of reception elements (3);
 fastening elements (7) projecting from the belt surface are present for entering into a releasable connection and arranged at a specific fixed division from one another at a corresponding transportation belt (2); and
 the reception elements (3) that can be brought into connection with the fastening elements (7) for forming a shuttle (6) for a plurality of articles to be transported, are divided in accordance with the specific, fixed division of the arrangement of the fastening elements (7).

13. An apparatus (1) in accordance with claim 12, wherein the shuttle (6) formed from a plurality of reception elements (3) is separated without considering the actual division of the articles to be conveyed so that the center of the shuttle (6) always lies at the same position of the transportation belt (2) independently of the size and of the format of the articles to be transported.

* * * * *